(12) United States Patent
Guignon et al.

(10) Patent No.: US 12,462,009 B2
(45) Date of Patent: Nov. 4, 2025

(54) DEVICE AND METHOD FOR AUTHENTICATING A USER OF A VIRTUAL REALITY HELMET

(71) Applicant: ORANGE, Issy-les-Moulineaux (FR)

(72) Inventors: Richard Guignon, Chatillon (FR); Sébastien Poivre, Chatillon (FR); Gildas Belay, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 134 days.

(21) Appl. No.: 18/254,967

(22) PCT Filed: Nov. 29, 2021

(86) PCT No.: PCT/FR2021/052118
§ 371 (c)(1),
(2) Date: May 30, 2023

(87) PCT Pub. No.: WO2022/112727
PCT Pub. Date: Jun. 2, 2022

(65) Prior Publication Data
US 2024/0012898 A1    Jan. 11, 2024

(30) Foreign Application Priority Data
Nov. 30, 2020  (FR) ..................................... 2012408

(51) Int. Cl.
*G06F 21/36*    (2013.01)
*G06F 1/16*    (2006.01)

(52) U.S. Cl.
CPC .............. *G06F 21/36* (2013.01); *G06F 1/163* (2013.01)

(58) Field of Classification Search
CPC ................................. G06F 1/163; G06F 21/36
See application file for complete search history.

(56) References Cited

U.S. PATENT DOCUMENTS

| | | | |
|---|---|---|---|
| 2016/0188861 A1* | 6/2016 | Todeschini .............. | G06F 3/017 726/7 |
| 2018/0064851 A1* | 3/2018 | Alsberg ............... | C12N 5/0697 |

(Continued)

FOREIGN PATENT DOCUMENTS

FR    3081572 A1    11/2019

OTHER PUBLICATIONS

English translation of the Written Opinion of the International Searching Authority dated Mar. 10, 2022 for corresponding International Application No. PCT/FR2021/052118, filed Nov. 29, 2021.

(Continued)

*Primary Examiner* — Mohamed A. Wasel
(74) *Attorney, Agent, or Firm* — David D. Brush; Westman, Champlin & Koehler, P.A.

(57) ABSTRACT

An authentication device including an analyser capable of verifying whether an image relating to at least one element of a real environment captured by a virtual reality helmet corresponds to a reference datum stored in association with an identifier of the user of the virtual reality helmet. The use of the virtual reality helmet can thus be linked to the room in which the helmet is located. The authentication is thus carried out by using the visual "footprint" of the room. Alternatively, the authentication may depend on a password made up of objects as opposed to letters or numbers. The objects correspond to images of said objects captured according to the viewing directions of the user in order to compose the object password.

15 Claims, 5 Drawing Sheets

(56) References Cited

U.S. PATENT DOCUMENTS

| | | | |
|---|---|---|---|
| 2018/0150690 A1* | 5/2018 | Yin | A61B 3/0008 |
| 2019/0098005 A1* | 3/2019 | Joshi | G06Q 20/40145 |
| 2019/0179148 A1* | 6/2019 | Hori | G06F 3/04847 |
| 2019/0332758 A1* | 10/2019 | Yin | G06F 3/013 |
| 2019/0354758 A1* | 11/2019 | Wu | G02B 27/0093 |
| 2020/0092092 A1* | 3/2020 | Zhao | G06F 21/31 |
| 2021/0134110 A1* | 5/2021 | Irwin, Jr. | G06F 21/31 |
| 2022/0038891 A1* | 2/2022 | duPont | G06V 10/25 |

OTHER PUBLICATIONS

International Search Report dated Mar. 10, 2022 for corresponding International Application No. PCT/FR2021/052118, filed Nov. 29, 2021.

Written Opinion of the International Searching Authority dated Mar. 10, 2022 for corresponding International Application No. PCT/FR2021/052118, filed Nov. 29, 2021.

* cited by examiner

DEVICE AND METHOD FOR AUTHENTICATING A USER OF A VIRTUAL REALITY HELMET

CROSS-REFERENCE TO RELATED APPLICATIONS

This Application is a Section 371 National Stage Application of International Application No. PCT/FR2021/052118, filed Nov. 29, 2021, which is incorporated by reference in its entirety and published as WO 2022/112727 A1 on Jun. 2, 2022, not in English.

TECHNICAL FIELD

The invention relates to the authentication of a user of a virtual reality headset.

PRIOR ART

Authentication makes it possible to legitimize the request for access to a device (computer, smartphone, connected object, etc.) or to a service (website, application, cloud, video on demand—or VoD, teleconferencing, collaborative space, etc.) by a person in order to authorize access to the resources (system, communication network, applications, content items, etc.) of the device or service.

For this purpose, authentication consists in verifying the identity of the person requesting access to the device or to the service by verifying access data such as a password, a datum provided by an identification component such as a chip card, an electronic certificate, etc., a biometric datum (fingerprints, iris, face), a signature or a gesture.

The type of access data generally depends on the degree of security of the device or service to be accessed and on the device used to provide these access data.

In the coming years, virtual reality and virtual reality systems will be subject to a certain development. However, the use of such virtual and/or augmented reality systems in certain uses, in particular professional uses, sometimes requires authenticating the user of these systems. For example, access to a virtual reality meeting for a participant requires this participant to be authenticated before they are allowed to access the meeting and, in particular, the documents exchanged during said meeting. In addition, if this participant wishes to share some of their documents, they must be able to access them securely from the virtual meeting without the other participants also having access thereto.

However, at present, the authentication of users to communication devices and/or services provided via communication networks is still very often based on the use of a keyboard and/or a mouse to enter a user identifier (also called login) and a password or an authentication code.

Indeed, the use of biometric data has long been limited due to sensors unavailable on communication devices and high computational costs involved in recognizing these biometric data. At present, in particular in the field of mobile telephony, fingerprint-based user authentication is on the increase, and facial recognition-based user authentication is slowly taking off. However, the latter is not always reliable, demonstrating the difficulties in carrying out authentication other than by using a conventional login/password.

However, in the context of virtual reality, the use of a login/password is still prevalent regardless of the type of headset: headset connected to a computer (such as the Oculus Rift™ and the HTC Vive™) or autonomous headset (such as the Oculus Quest™, etc.).

In the case of the headset connected to a computer, a keyboard and/or a mouse are often available to allow the user to enter their login/password. However, user experience is degraded because the user has to switch from the computer to the headset at the time of authentication. Picking up on our example of a virtual meeting, the user, in order to enter their login/password to access their personal documents in order to share some of them with the other participants, will have to take off their headset, that is to say "leave" the meeting even though the headset remains connected thereto. Indeed, the user not only will no longer see or hear what is happening in the virtual meeting, but will also no longer be able to participate until they have put their headset back on. Ideally, the virtual reality experience should be immersed in the headset at all times.

In the case of the autonomous headset, the user does not have a physical keyboard for easily entering authentication information. Although it is possible to display a virtual keyboard so as to allow the user to enter their authentication information, the interaction is not as natural as with a real keyboard, leading to authentication errors.

SUMMARY OF THE INVENTION

One of the aims of the present invention is to provide improvements with respect to the prior art.

One subject of the invention is an authentication device for authenticating a user of a virtual reality headset, the authentication device comprising an analyzer able to verify whether an image relating to at least one element of a real environment captured by the virtual reality headset corresponds to a reference datum stored in association with an identifier of the user of the virtual reality headset.

The use of the virtual reality headset may thus be linked to the room where the headset is located. Reference will thus be made to authentication using the fingerprint of the room, visual fingerprint of the room (for example: recognition between one or more recorded images of the room and one or more captured images).

As an alternative, the authentication will possibly be dependent not on a password made up of letters or numbers, but of objects. The objects correspond to images of these objects that are captured based on directions looked in by the user to enter the object password.

Advantageously, the authentication device comprises a model generator for generating a model of elements of a real environment, and the model generator is able to determine a model of the element corresponding to the captured image.

The analysis is thus carried out not on an image but on one or more models generated from the image: the model is in particular a plan of the room, a plan of one or more objects identified in the room, etc. The use of a model rather than images makes it possible to reduce computational costs for the verification.

Advantageously, the authentication device comprises a computer able to implement image recognition, and the computer provides a result from the following:
the result of the verification of the correspondence between the relative image of the captured element with the reference datum, to the analyzer;
a model of the element, to the model generator.

The analyzer is thus based on data obtained from the image that are captured with greater precision, thus reducing authentication errors (in particular the hotel room phenomenon, that is to say similar room phenomenon, which would possibly lead to erroneous authentications: false positives, with a system based in particular on simple modeling of the real environment and/or of one or more objects located there).

Advantageously, the authentication device comprises a controller for controlling at least one sensor of the virtual reality headset, the controller being able to trigger the sensor providing an image of an element of a captured real environment to the authentication device.

The camera may thus be triggered by the authentication device, in particular when the camera is oriented in a predetermined direction, in particular associated with the reference data or when the framing of the real environment by the camera corresponds to that of the image of the reference data. This avoids human authentication errors.

Advantageously, the authentication device comprises a generator for generating guidance information on the basis of the identifier of the user, the generator provides the guidance information to the virtual reality headset, and the guidance information is able to be used to orient the virtual reality headset in a direction associated with the identifier of the user.

The camera is thus positioned in the same direction as that which enabled the reference data to be stored, thus reducing analysis computational costs and erroneous denials of authentication: false negatives linked to the fact that, for example, the captured image will be slightly offset on one side from the image used by the reference data omitting an element: furniture, component of the room (window, door, corner, hanging, etc.).

Advantageously, the analyzer is able to verify whether a series of images relating to captured elements of a real environment corresponds to a series of reference data stored in association with an identifier of a user requesting authentication.

The authentication is thus strengthened as it does not depend on a single image. In addition, the use of a series of images makes it possible to use, as authentication datum, a word that is not alphanumeric or a sentence that is not formed of words, but images or objects present in the real environment. For example, the password according to the invention may be a chair, a plant, a door and an animal appearing on a poster, all of these elements being in the room, that is to say the real environment. The virtual reality headset may thus be used only in rooms for which the user has registered.

Advantageously, the element is one of the following elements:
an object placed in the real environment,
an area of the real environment.

Advantageously, the reference data are at least one type of data from the following:
a reference image;
a reference model of the room and/or of an object of a real environment;
a reference plan of a room of a real environment.

Another subject of the invention is a method for authenticating a user of a virtual reality headset, the authentication method comprising
verifying whether an image relating to at least one element of a real environment captured by the virtual reality headset corresponds to a reference datum stored in association with an identifier of the user of the virtual reality headset.

Advantageously, the identifier of the user is stored in association with a plurality of distinct reference data corresponding to distinct real environments.

Advantageously, the verification comprises a comparison from the following:
a comparison with one of the stored reference data corresponding to a location of the virtual reality headset during authentication;
a comparison with all of the stored reference data.

Another subject of the invention is a registration device for registering a user of a virtual reality headset, the registration device comprising a recorder for recording a reference datum in association with an identifier of the user of the virtual reality headset, the reference datum corresponding to an image relating to at least one element of a real environment captured by the virtual reality headset during registration.

Another subject of the invention is a virtual reality headset comprising:
a registration device for registering a user of a virtual reality headset, able to store, in association with an identifier of the user of the virtual reality headset, a first reference datum, the reference datum corresponding to an image relating to at least one element of a real environment captured by the virtual reality headset during registration, and
an authentication device able to verify whether an image relating to at least one element of a real environment captured by the virtual reality headset corresponds to the reference datum stored in association with the identifier of the user of the virtual reality headset.

Another subject is a method for registering a user of a virtual reality headset, the registration method comprising
storing, in association with an identifier of the user of the virtual reality headset, a first reference datum, the reference datum corresponding to an image relating to at least one element of a real environment captured by the virtual reality headset during registration.

Advantageously, the registration method comprises, when the virtual reality headset is first used in a second real environment, repeating the storage step for the user for a second reference datum.

Advantageously, according to one implementation of the invention, the various steps of the method according to the invention are implemented by software or a computer program, this software comprising software instructions intended to be executed by a data processor of an authentication device and/or of a registration device and being designed to command the execution of the various steps of this method.

The invention therefore also targets a program comprising program code instructions for executing the steps of the authentication method and/or a registration method when said program is executed by a processor.

This program may use any programming language, and be in the form of source code, object code, or intermediate code between source code and object code, such as in a partially compiled form, or in any other desirable form.

BRIEF DESCRIPTION OF THE DRAWINGS

The features and advantages of the invention will become more clearly apparent upon reading the description, given by way of example, and the related figures, in which.

DESCRIPTION OF THE EMBODIMENTS

A virtual reality headset is understood to mean any type of headset or glasses comprising multimedia content reproducers, such as: one or more screens, one or more loudspeakers, etc. and allowing a user wearing the headset to interact with the multimedia content item, i.e. directly by way of the headset (for example the headset being equipped with interaction buttons and/or one or more sensors: camera, microphone allowing the user wearing the headset to control interaction with the content item reproduced by the headset).

A virtual reality headset is understood to mean a virtual reality and/or augmented reality headset.

Figure 1:
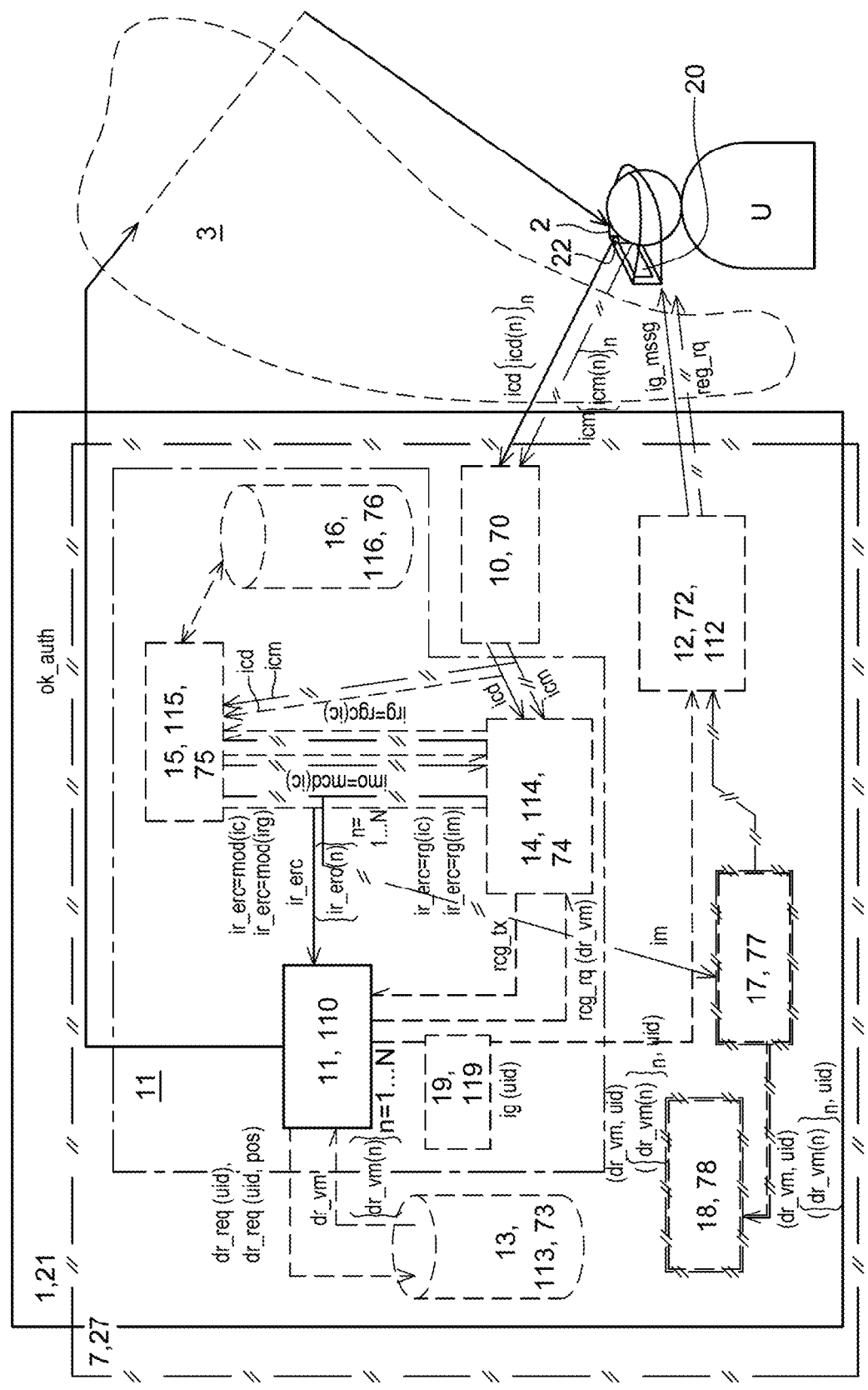
FIG. 1 shows a simplified diagram of an authentication device according to the invention.

FIG. 1 illustrates a simplified diagram of an authentication device according to the invention.

The authentication device 1, 21 is a device able to authenticate a user U of a first virtual reality headset 2. The authentication device 1, 21 for authenticating a user U of a virtual reality headset 2 comprises an analyzer 11 able to verify whether an image relating to at least one element of a real environment ir_erc captured by the virtual reality headset 2 corresponds to a reference datum dr_vm stored in association with an identifier uid of the user U of the virtual reality headset 2.

In particular, the reference datum dr_vm has been stored prior to the implementation of the authentication by the authentication device 1, 21 and/or prior to an access request triggering authentication by the authentication device 1, 21 according to the invention.

In particular, the stored value dr_vm was stored by a user register 7, 27 upon first access to a product or service requiring authentication.

In particular, the authentication device 1, 21 comprises at least one receiver 10 for receiving an image icd captured by the headset 2. The receiver 10 receives the captured image icd coming in particular from a sensor 22, such as a camera, a 360° camera, an IR camera, etc. of the headset 2, implemented in particular directly in the headset 2.

In particular, the authentication device 1, 21 comprises a model generator 15, 115 for generating a model of elements of a real environment. The model generator 15, 115 is able to determine a model imo of the element corresponding to the captured image icd. The model generator 15, 115 possibly uses a model base 16, 116 to determine the model imo.

In particular, the authentication device 1, 21 comprises a computer 14, 114 able to implement image recognition. The computer 14, 114 performs in particular image processing on the captured image icd. For example, the computer 14, 114 executing image processing through image recognition is able to provide at least one model of an element mo(elt) present in the captured image icd to the model generator 15, 115 or directly to the analyzer. The model generator 15, 115 possibly generates a model of the real environment imo using one or more models of elements mo(elt) provided by the computer 14, 114. In addition or as an alternative, the computer 14, 114 compares, by implementing image recognition, the captured image icd and the image stored as reference datum dr_vm.

In particular, the computer 14, 114 provides a result from the following:
the result rcg_tx of the verification of the correspondence between the relative image of the captured element with the reference datum, to the analyzer 11;
a model of the element mo(elt), to the model generator.

The result of the verification is in particular a precise correspondence level (for example with pixel-by-pixel comparison, with color verification, etc.) or a rough correspondence level (for example with comparison of contrast lines, etc.).

In particular, the authentication device 1, 21 comprises a controller 12, 112 for controlling at least one sensor 22 of the virtual reality headset 2. The controller 12, 112 is able to trigger the sensor 22 providing an image icd of an element of a captured real environment erc to the authentication device 1, 21. In particular, the controller 12, 112 comprises a comparator (not illustrated) able to compare a datum dc captured by the headset 2 with a framing datum dcd associated with the reference datum dr_vm of the user U.

In a first alternative, the framing datum dcd is a geographical orientation (30° N for example) or an angle with respect to a reference in real space (15° with respect to the axis of the user U with the door), etc. In this case, the headset 2 comprises at least one gyroscope able to provide an angle with respect to geographic north or with respect to a reference point. In the case of the reference point, the authentication device 1 will provide guidance information ig to the headset 2. In a first alternative, the headset 2 will reproduce the guidance information ig either on the screen 20 of the headset 2 or at least the loudspeakers of the headset 2. The guidance information ig will for example ask the user U to position themselves facing the reference point or with their back to the reference point. In a second alternative, the guidance information ig will command the movement of the camera 22 of the headset 2 until said camera is positioned facing the reference point. Then, the user U will move or the controller 12 will command the movement of the camera 22. The controller 12 will then compare the angle of the captured datum dc with the stored framing datum dcd. When the angle of the captured datum dc corresponds to the stored framing datum dcd, the controller 12 will trigger the capture of the image icd.

In a second alternative, the captured datum dc is an image captured by the camera 22 of the headset 2 and the framing datum dcd is either the reference datum dr_vm or is formed by one or more reference points in the image on which the reference datum dr_vm depends. The controller 12 thus verifies whether the capture position of the captured image dc is that of the image of the reference datum dr_vm and/or whether the one or more reference points of the reference datum dr_vm are present in the captured datum dc. As soon as the verification is positive, the controller 12 triggers the camera 22, which captures the image icd that enables authentication. The camera 22 then provides the captured image icd to the authentication device 1, 21, and more specifically to the analyzer 11, 110.

In particular, the authentication device 1, 21 comprises a generator 19, 119 for generating guidance information ig(uid) on the basis of the user identifier uid. The generator 19, 119 provides the guidance information ig to the virtual reality headset 2. In particular, the guidance information ig may be used to orient the virtual reality headset 2 in a direction dir associated with the identifier of the user uid. The guidance information ig may possibly be reproduced by the headset 2, for example by the screen 20 or loudspeakers (not illustrated).

In particular, the analyzer 11 is able to verify whether a series of images $\{ir\_erc(n)\}_{n=1 \ldots N}$ relating to captured elements of a real environment corresponds to a series of reference data $\{dr\_vm(n)\}_{n=1 \ldots N}$ stored in association with an identifier uid of a user U requesting authentication.

If the reference data are a series of reference data values $\{dr\_vm(n)\}_{n=1 \ldots N}$, the guidance information ig makes it possible to capture a series of images $\{icd(n)\}_n$. For example, the guidance information will ask the user to first look at a chair, a frame, a window, etc. The analyzer 11 will determine that the authentication is positive ok_auth if the combination of the chair, the frame and the window looked at by the user U correspond to those recorded in the base 13, 113 as reference data $\{dr\_vm(n)\}_{n=1 \ldots N}$.

In particular, the element is one of the following elements:
an object placed in the real environment,
an area of the real environment.

In particular, the reference data dr_vm are at least one type of data from the following:
a reference image;
a reference model of the room and/or of an object of a real environment;
a reference plan of a room of a real environment.

FIG. 1 illustrates one particular embodiment of a registration device 7, 27 for registering a user U of a virtual reality headset 2. In this particular embodiment, the registration device 7, 27 and the authentication device 1, 21 are implemented in an electronic device (not illustrated) such that certain elementary devices (10, 70), (12, 112, 72), (13, 113, 73), (14, 114, 74), (15, 115, 75), (16, 116, 76) implemented in this electronic device are shared by the registration device 7, 27 and the authentication device 1, 21. For example, the registration device 7, 27 and the authentication device 1, 21 both use at least one common device from the following: the captured-image receiver 10, 70, the model generator 15, 115, 75, the image recognition computer 14, 114, 74, the controller 12, 112, 72, etc.

The registration device 7, 27 comprises a recorder 18, 78 for recording a reference datum dr_vm in association with an identifier uid of the user U of the virtual reality headset 2, the reference datum dr_vm corresponding to an image im relating to at least one element of a real environment captured by the virtual reality headset 2 during registration.

In particular, the registration device 7, 27 comprises a coupler 17, 77 associating the identifier uid of the user U with the reference datum dr_vm. The coupler 17, 77 is connected to the recorder 18, 78 and provides it with the identifier-reference datum pair (dr_vm, uid).

In particular, the registration device 7, 27 comprises at least one receiver 70 for receiving an image icm captured by the headset 2. The receiver 10 receives the captured image icm coming in particular from a sensor 22, such as a camera, a 360° camera, an IR camera, etc. of the headset 2, implemented in particular directly in the headset 2.

In particular, the registration device 7, 27 comprises a model generator 75 for generating a model of elements of a real environment. The model generator 75 is able to determine a model imo of the element corresponding to the captured image icm. The model generator 75 possibly uses a model base 76 to determine the model imo.

In particular, the registration device 7, 27 comprises a computer 74 able to implement image recognition. The computer 74 performs in particular image processing on the captured image icm. For example, the computer 74 executing image processing through image recognition is able to provide at least one model of an element im present in the captured image icm to a model generator 75 or directly to the coupler 17, 77. The model generator 75 possibly generates a model of the real environment imo using one or more models of elements mo(elt) provided by the computer 74.

In particular, the registration device 7, 27 comprises a controller 72 for controlling at least one sensor 22 of the virtual reality headset 2. If the authentication is carried out on the basis of a "fingerprint" of the real environment, the controller 72 is able to trigger the sensor 22 providing an image icm or a series of images $\{icm(n)\}_n$ to the registration device 7, 27. For example, the fingerprint of the real environment may be an image systematically centered on the door of the room where the user U is located, or an image systematically taken when the user U is in an intended starting immersion position in the real environment (suitable seat, secure area, etc.).

In particular, the controller 72 sends a registration request reg_rq to the headset 2. The user thus provides an identifier uid and then commands the recording of the image icm or of the series of images $\{icm(n)\}_n$ to be stored as a "password". The registration request reg_rq possibly guides the camera 22 and/or the user U in the recording of the images icm.

When the authentication is based not on the recognition of an object or of a series of objects, but on a "fingerprint" of the real environment, the registration device 7, 27 is able to register, with the identifier of the user, not a single reference datum dr_vm or series of reference data $\{dr\_vm(n)\}_{n=1 \ldots N}$ but a plurality thereof: for example, a first reference datum dr_vm1, a second reference datum dr_vm2, . . . , an lth reference datum dr_vml, or a first series of reference data $\{dr\_vm1(n)\}_{n=1 \ldots N}$, a second series of reference data $\{dr\_vm2(n)\}_{n=1 \ldots N}$, . . . , an lth series of reference data $\{(d\_vml(n)\}n1 \ldots N$ corresponding respectively to a first, a second, . . . an lth real environment in which the user U uses the headset 2. The "fingerprint"-based authentication of the real environment thus allows the user U to use the headset in more than one distinct real environment.

The virtual reality headset 2 in particular comprises:
a registration device 27 for registering a user U of a virtual reality headset 2, able to store, in association with an identifier uid of the user U of the virtual reality headset 2, a first reference datum dr_vm, the reference datum corresponding to an image relating to at least one element of a real environment captured by the virtual reality headset 2 during registration, and
an authentication device 21 able to verify whether an image ir_erc relating to at least one element of a real environment captured by the virtual reality headset 2 corresponds to the reference datum dr_vm stored in association with the identifier uid of the user U of the virtual reality headset 2.

FIG. 1 illustrates the case of an autonomous virtual reality headset 2, that is to say one embedding the operating device (not illustrated) of the headset, for example in the form of a processor executing instructions implementing an operating process. The operating device comprises in particular a multimedia content computer that is modified on the basis of at least one multimedia content item read from a content base and at least one captured or detected interaction datum. The content item is a video game, an audio and/or video content item, an interactive multimedia content item, etc.

Figure 2A:
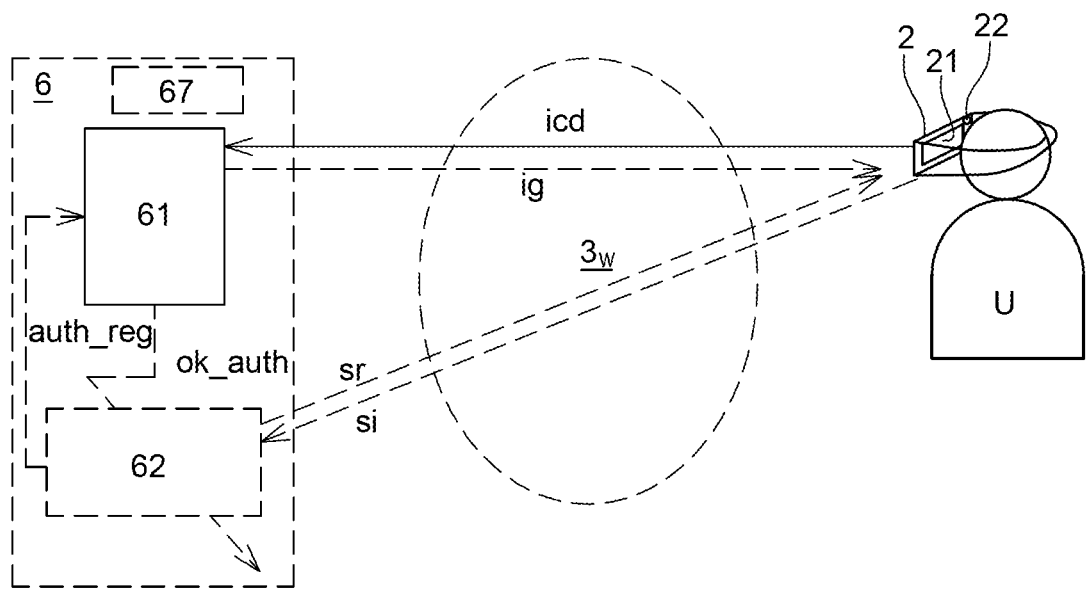
FIG. 2a shows a simplified diagram of a first mode of implementation of the authentication device according to the invention.
Figure 2B:
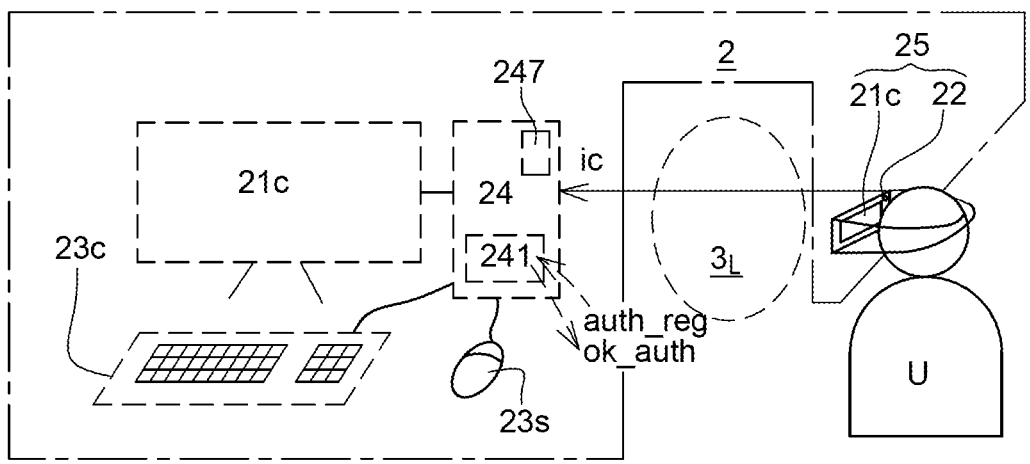
FIG. 2b shows a simplified diagram of a second mode of implementation of the authentication device according to the invention.

FIGS. 2a and 2b show various implementations of the authentication device 1, 21 according to the invention, in particular as illustrated by FIG. 1.

FIG. 2a illustrates a simplified diagram of a first mode of implementation of the authentication device 1, 21 according to the invention.

In this first mode of implementation, the authentication device 61 is implemented in an electronic device 6 that is possibly remote from the headset 2. If the electronic device 6 is remote, it is connected to the headset 2 via a communication network 3w, in particular a wide-area communication network or WAN for Wide Area Network, such as an Internet network, a mobile communication network, etc.

The electronic device 6 is in particular a personal electronic device situated in the home of the user U or a professional electronic device situated in the office of the user U while the user U with the headset 2 is located remotely, in particular in a second home, a rental, a hotel or on the premises of a partner, etc., or a service provision server for providing services, such as a website, an application, a content provider (video on demand, cloud, etc.), etc.

In particular, the electronic device 6 comprises an access provision device 62.

The user U uses the headset 2 to request access to a service or a product from an access provision device, for example the device 62. The access provision device 62 asks the authentication device 61 according to the invention to authenticate auth_req the user U.

The authentication device 61 receives at least one image icd. The authentication device 61 then verifies whether the image relating to the real environment ir_erc (possibly consisting of the received captured image icd) corresponds to the reference datum dr_vm associated with the user U.

In particular, the electronic device 6 comprises a user registration device 67. The registration device 67 registers a reference datum dr_vm in association with an identifier of the user uid, for example in a user base (not illustrated).

In particular, the authentication device 61 retrieves the reference datum dr_vm that it uses to implement the verification from the user base where it was registered beforehand in association with the identifier of the user uid by the registration device 67.

In particular, if it does ok_auth, the authentication device 61 activates the access provision device 62.

The access provision device 62 then gives the first electronic device 2 access to the product or service. For example, the access provision device 62 sends a reproduction signal sr to the headset 2, which reproduces the accessed service and/or a menu for interacting with the accessed product or service. The headset 2 thus makes it possible to transmit an interaction signal si to the access provision device 62 on the basis of the reproduction signal sr reproduced by the headset 2.

FIG. 2b illustrates a simplified diagram of a second mode of implementation of the authentication device 241 according to the invention.

In this second mode of implementation, the authentication device 241 is implemented either in an electronic device 24 of which the headset 25 is a peripheral, or directly in a virtual reality system 2 comprising a peripheral 25, such as a virtual reality headset. The headset 25 is connected to the electronic device 24 via a communication network 3L, in particular a local area communication network formed either by a wired connection, in particular of Ethernet or USB type, or by a wireless local area network.

Either the augmented reality system 2 or the electronic device 24 comprises an authentication device 241 for authenticating the user of the virtual reality headset 25, able to verify whether an image relating to at least one element of a real environment ir_erc captured by the virtual reality headset 25 corresponds to a reference datum dr_vm stored in association with an identifier uid of the user U of the virtual reality headset 25.

The electronic device 24 is in particular a personal computer or a tablet, etc. equipped with one or more peripherals: one or more reproduction interfaces such as a screen $21_e$ and, where applicable, a headset 25 (comprising in particular a screen $21_e$ and a sensor 22, such as a camera); one or more input interfaces such as a keyboard $23_c$, a mouse $23_s$, etc.

The user U uses the headset 25 to request access to a service or a product from an access provision device. The access provision device asks the authentication device 241 according to the invention to authenticate auth_req the user U.

The authentication device 241 receives at least one image icd. The authentication device 61 then verifies whether the image relating to the real environment ir_erc (possibly consisting of the received captured image icd) corresponds to the reference datum dr_vm associated with the user U.

In particular, if it does ok_auth, the authentication device 241 activates the access provision device.

The access provision device then gives the virtual reality system 2 access to the product or service, which virtual reality system reproduces the access provision using at least the headset 25.

In particular, the virtual reality system 2 comprises a user registration device 247. The registration device 247 registers a reference datum dr_vm in association with an identifier of the user uid, for example in a user base (not illustrated).

In particular, the authentication device 241 retrieves the reference datum dr_vm that it uses to implement the verification from the user base where it was registered beforehand in association with the identifier of the user uid by the registration device 247.

Figure 3:
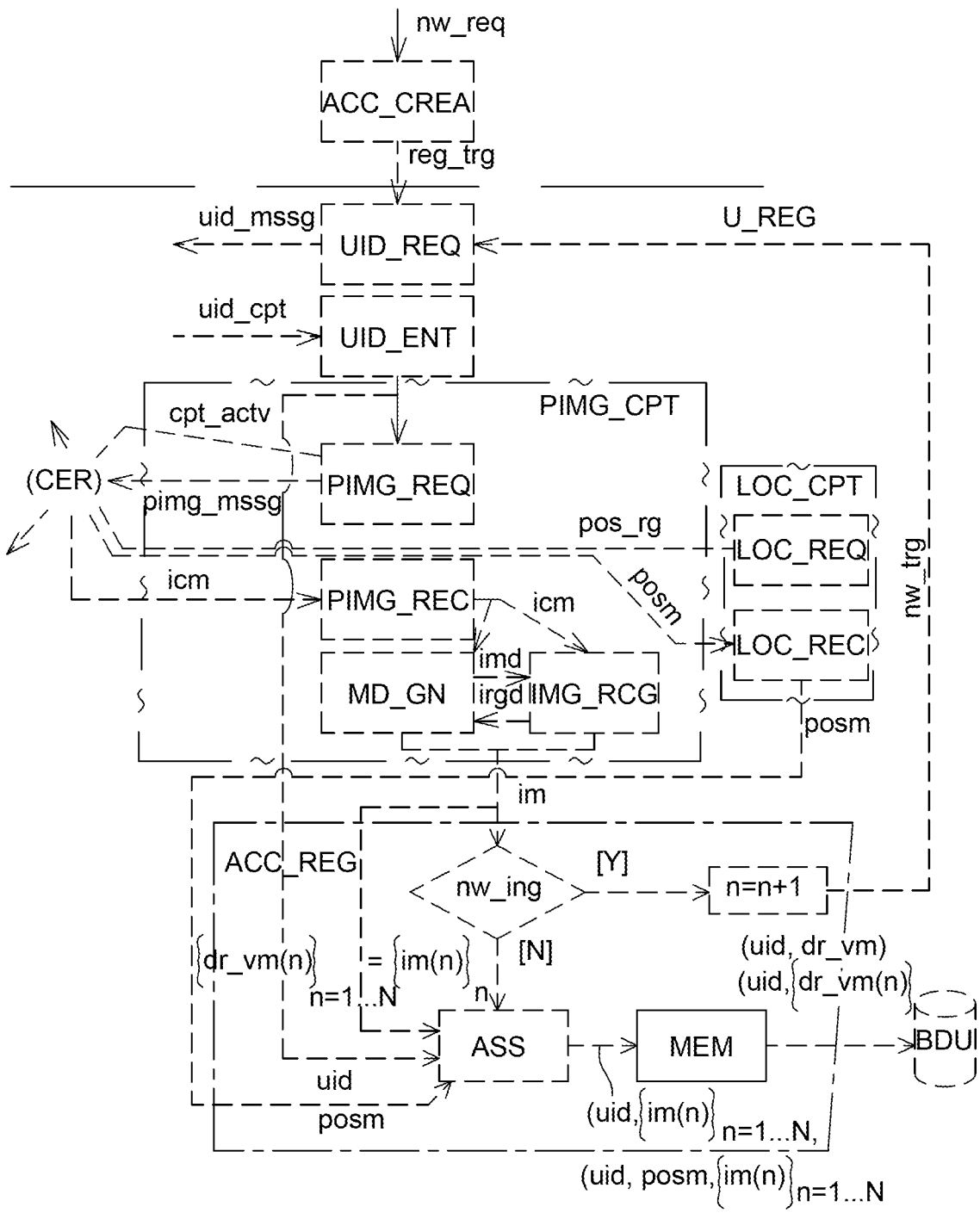
FIG. 3 shows a simplified diagram of a method for registering a user according to the invention.

FIG. 3 illustrates a simplified diagram of a method for registering a user U according to the invention.

The registration method U_REG for registering a user U of a virtual reality headset CER comprises storing MEM, in association with an identifier uid of the user U of the virtual reality headset 2, a first reference datum dr_vm1, the first reference datum dr_vm1 corresponding to an image ir_erc relating to at least one element of a first real environment captured by the virtual reality headset 2 during registration.

In general, a reference datum dr_vm corresponding to an image ir_erc relating to at least one element of a real environment. FIG. 1 uses this generic notation rather than those associated with a first reference datum dr_vm1, a second reference datum dr_vm2 . . . an lth reference datum dr_vml, and respectively with a first, a second . . . an lth real environment.

The captured image icm received by the registration method U_REG is stored MEM directly or indirectly. If the captured image is stored directly, the reference datum dr_vm consists of the captured image icm.

In particular, the registration method U_REG comprises, when the virtual reality headset 2 is first used in a second real environment, repeating the storage step for the user U for a second reference datum dr_vm2.

In particular, the registration method U_REG comprises capturing PIMG_CPT at least one image ir_erc relating to at least one element of a first real environment, the image ir_erc relating to at least one element of a first real environment being stored MEM directly or indirectly as first reference datum dr_vm1.

In particular, the user registration method U_REG comprises creating access ACC_CREA, in particular when the access method implements the steps of the registration method U_REG.

In particular, the registration method comprises a user identifier request UID_REQ that sends an identification message uid_mssg to the user U. The identification message uid_mssg is in particular able to be reproduced by a reproduction interface.

Following the reproduction of the identification message uid_mssg, the user provides a user identifier uid to an input interface, such as an entry interface: keyboard, mouse, stylus, touch screen, etc., or a sensor: camera, microphone, etc. The user identifier uid is in particular a name, a pseudonym, an email address, an identifier of a terminal of the user, such as a telephone number, etc.

In particular, the registration method U_REG comprises a user identifier input UID_ENT receiving a signal uid_cpt from the input interface comprising an identifier of the user uid.

In particular, the capture PIMG_CPT of at least one image im relating to at least one element of a first real environment comprises a request to provide the access code, also called authentication code, PIMG_REO, which sends an authentication code registration message pimg_mssg to the user U. The authentication code registration message pimg_mssg is in particular able to be reproduced by a reproduction interface.

In particular, the registration method U_REG comprises receiving PIMG_REC at least one captured image icm. In particular, the capture PIMG_CPT comprises receiving PIMG_REC at least one captured image icm.

In particular, the registration method U_REG comprises modeling MD_GN the captured image icm and/or one or more elements present in the captured image icm. In particular, the capture PIMG_CPT comprises the modeling MD_GN.

In particular, the registration method U_REG comprises performing image recognition IMG_RCG on the captured image icm and/or one or more elements present in the captured image icm. In particular, the capture PIMG_CPT comprises the image recognition IMG_RCG.

In particular, the modeling MD_GN determines one or more models of the captured image and/or of elements of the captured image on the basis of recognition data irgd provided by the image recognition IMG_RCG.

In particular, the image recognition IMG_RCG recognizes one or more elements of the captured image on the basis of models imd provided by the modeling MD_GN.

The capture PIMG_CPT provides a relative image im based on the received captured image icm and/or on the results imd, irgd of one or more processing operations applied to this received captured image icm, such as the modeling MD_GN, the image recognition IMG_RCG, etc.

In particular, the registration method U_REG comprises a location capture LOC_CPT. Thus, when the user U registers a first reference datum dr_vm1, and then a second reference datum dr_vm2, these may be stored with a location datum posm that facilitates the analysis carried out by the authentication method.

In particular, the registration method U_REG comprises receiving LOC_REC a first location datum posm1 corresponding to the first real environment prior to the registration MEM of the first reference datum dr_vm1. The storage MEM then comprises registering the first reference datum dr_vm1 and the first location datum posm1 in association with the identifier of the user uid. It should be noted that the first location datum posm1 and the first reference datum dr_vm1 are linked together in particular in the form of a pair.

In particular, the location capture LOC_CPT comprises receiving a location datum LOC_REC.

In particular, the registration method U_REG comprises a location datum request LOC_REQ, which sends a request pos_rq to the headset CER, in particular in the form of a command intended for a location sensor of the headset (GPS sensor, NFC sensor or QR code sensor, etc., for example). For example, each real environment, in particular each room of an office building, may be equipped with an NFC tag and/or provided with an identification QR code. In particular, the location capture LOC_CPT comprises the location datum request LOC_REQ.

In particular, the registration method U_REG comprises registering the access code ACC_REG, which comprises the storage MEM. In particular, the registration method U_REG, in particular the registration of the access code ACC_REG, comprises, prior to the storage MEM, associating ASS one or more reference data dr_vm=im, $\{dr\_vm(n))\}_{n=1\ldots N}=\{im(n)\}_n$ with the input user identifier uid and possibly the position or location datum posm.

In particular, the registration of the access code ACC_REG verifies whether the access code requires an additional reference datum nw_vi? in addition to the obtained reference datum dr_vm=im. If so [Y], a new capture is triggered nw_trg by iterating n=n+1 the reference datum dr_vm(n).

If not, all of the reference data dr_vm, $\{dr\_vm(n)\}_{n=1\ldots N}$ are provided directly to the storage MEM in order to be stored in association with the user identifier uid.

In particular, the association ASS provides a pair (uid, im)=(uid, dr_vm), (uid, $\{im(n)\}_n$)=(uid, $\{dr\_vm(n)\}_{n=1\ldots N}$) or a triplet (uid, posm, im)=(uid, posm, dr_vm), (uid, posm, $\{im(n)\}_n$)=(uid, posm, $\{dr\_vm(n)\}_{n=1\ldots N}$) to the storage MEM.

In particular, the reference data dr_vm, $\{dr\_vm(n)\}_{n=1\ldots N}$ are stored in a user database BDU.

In particular, the authentication device 1 according to the invention and/or an access provision device 62 implements the steps of the registration method U_REG.

One embodiment of the registration method U_REG is in particular a program comprising program code instructions for executing the steps of the registration method U_REG and, possibly, of an authentication method when said program is executed by a processor.

Figure 4:
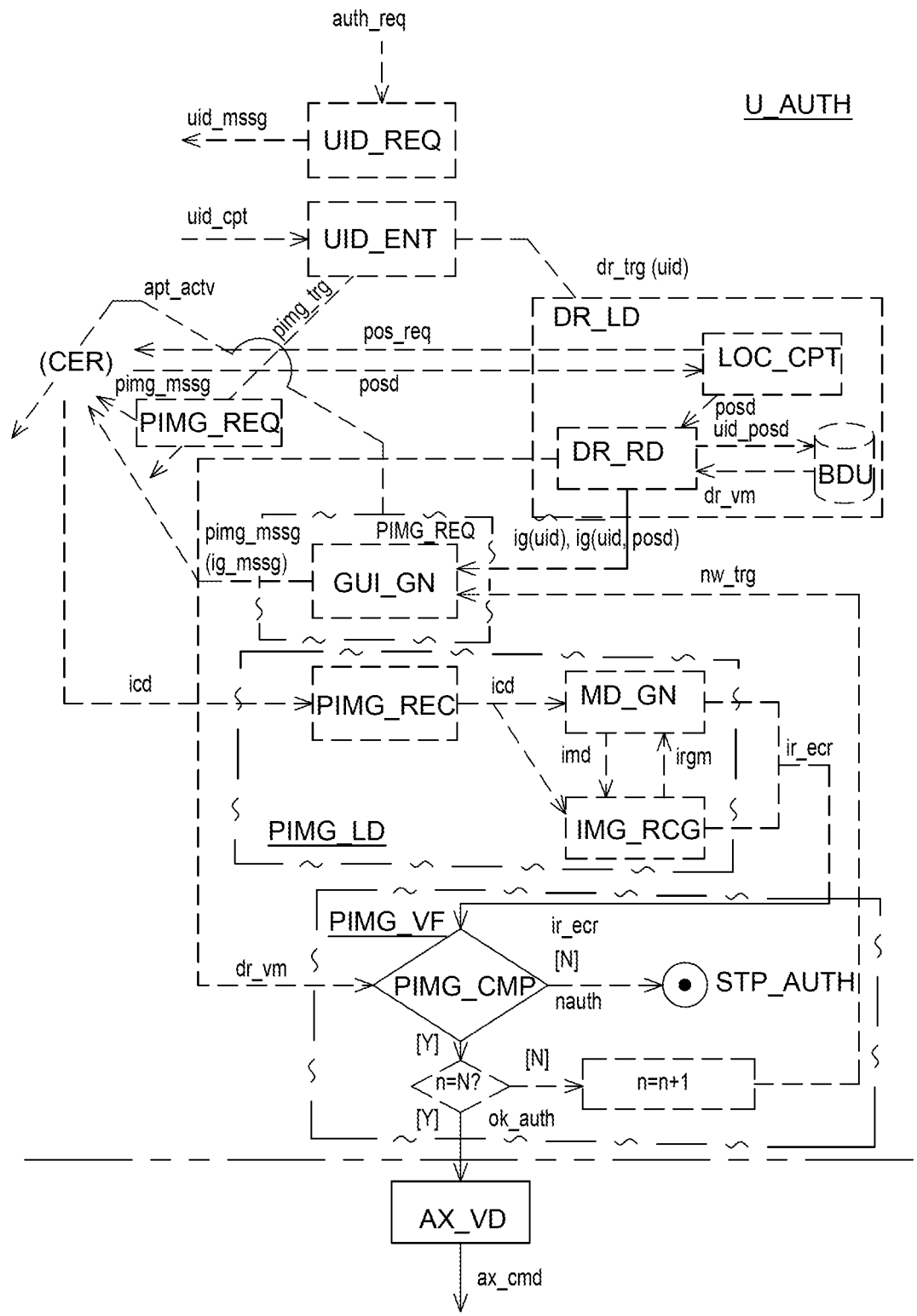
FIG. 4 shows a simplified diagram of an authentication method according to the invention.

FIG. 4 illustrates a simplified diagram of an authentication method according to the invention.

The authentication method U_AUTH for authenticating a user U of a virtual reality headset CER comprises
  verifying PIMG_CMP, PIMG_VF whether an image ir_erc relating to at least one element of a real environment captured by the virtual reality headset CER corresponds to a reference datum dr_vm stored in association with an identifier uid of the user U of the virtual reality headset CER.

In particular, the identifier uid of the user U is stored in association with a plurality of distinct reference data dr_vm1, dr_vm2 . . . dr_vml corresponding to distinct real environments.

In particular, the verification PIMG_VF comprises a comparison from the following:
  a comparison with one of the stored reference data dr_vm corresponding to a location posd of the virtual reality headset CER during authentication;
  a comparison PIMG_CMP with all of the stored reference data (dr_vm1, dr_vm2 . . . dr_vml)—not illustrated.

In particular, the authentication method U_AUTH comprises determining PIMG_CLC the image ir_erc relating to at least one element of a captured real environment.

In particular, the authentication method U_AUTH comprises
  retrieving PIMG_RLD at least one image relating to at least one element of a captured real environment ir_erc.

In particular, the authentication method U_AUTH comprises
  receiving at least one captured image icd, the captured image icd being verified PIMG_CMP. For example, the retrieval PIM_REC of a captured image is reception of a captured image icd transmitted by the headset 2. In particular, the retrieval of the relative image PIMG_CLC comprises the reception of the captured image PIMG_REC.

In particular, the authentication method U_AUTH comprises a request PIMG_REO to provide the access code, also called authentication code, which sends an authentication code provision message pimg_mssg to the user U. The authentication code provision message pimg_mssg is in particular able to be reproduced by a reproduction interface. In particular, the request to provide the access code PIMG_REQ is triggered pimg_trg by the retrieval UID_ENT of the user identifier uid.

In particular, the retrieval PIMG_LD of at least one image relating to at least one element of a captured real environment ir_erc comprises a request PIMG_REQ to provide the access code, also called authentication code, which sends a guidance message ig_mssg to the user U. The guidance message ig_mssg is in particular able to be reproduced by a reproduction interface.

In particular, the authentication method U_AUTH comprises modeling MD_GN the captured image icd and/or one or more elements present in the captured image icd. In particular, the determination PIMG_CLC comprises the modeling MD_GN.

In particular, the authentication method U_AUTH comprises performing image recognition IMG_RCG on the captured image icd and/or one or more elements present in the captured image icd. In particular, the determination PIMG_CLC comprises the image recognition IMG_RCG.

In particular, the modeling MD_GN determines one or more models of the captured image and/or of elements of the captured image on the basis of recognition data irgd provided by the image recognition IMG_RCG.

In particular, the image recognition IMG_RCG recognizes one or more elements of the captured image on the basis of models imd provided by the modeling MD_GN.

The capture PIMG_CPT provides a relative image imd based on the received captured image icd and/or on the results imd, irgm of one or more processing operations applied to this received captured image icd, such as the modeling MD_GN, the image recognition IMG_RCG, etc.

In particular, the authentication method U_AUTH comprises
  retrieving DR_LD a reference datum dr_vm associated with the identifier of the user uid.

In particular, the authentication method U_AUTH comprises
  reading DR_RD at least one reference datum dr_vm, the reference datum dr_vm being used by the verification PIMG_CMP. For example, the reading DR_RD of a reference datum is carried out on the basis of the identifier of the user uid and possibly of a position posd captured by the headset 2. In particular, the retrieval of reference data DR_LD comprises reading reference data. In particular, the reading DR_RD is triggered dr_trg by inputting the user identifier UID_ENT.

In particular, the reading DR_RD sends a request for associated reference data dr_req(uid) to a memory device such as a user database BDU, also called user base, in which reference data have been stored beforehand. In response, the reading DR_RD receives, from the user database BDU, associated reference data dr_vm.

In particular, the reading DR_RD transmits read associated reference data pcr_vm to the verification of the access code PIMG_VF. In particular, the request to provide the access code PIMG_REQ generates a guidance message ig_mssg on the basis of the one or more read reference data dr_vm.

The user U may thus be guided by the guidance message ig_mssg to obtain the relative images ir_erc forming the access code.

In particular, a method for accessing a service or a device receives an access request acc_req (not illustrated). In particular, the access request triggers an authentication request auth_req prior to the provision of access by the access method.

In particular, the authentication method U_AUTH comprises receiving an authentication request AUTH_REC (not illustrated).

In particular, the authentication method U_AUTH comprises a user identifier request UID_REQ that sends an identification message uid_mssg to the user U. The identification message uid_mssg is in particular able to be reproduced by a reproduction interface. The user identifier request UID_REQ is in particular triggered by the authentication request auth_req.

Following the reproduction of the identification message uid_mssg, the user provides a user identifier uid to an input interface, such as an entry interface: keyboard, mouse, stylus, touch screen, etc., or a sensor: camera, microphone, etc. The user identifier uid is in particular a name, a pseudonym, an email address, an identifier of a terminal of the user, such as a telephone number, etc.

In particular, the authentication method U_AUTH comprises a user identifier input UID_ENT receiving a signal uid_cpt from the input interface comprising an identifier of the user uid.

In particular, the authentication method U_AUTH comprises receiving at least one captured image PIMG_REC. In particular, the retrieval PIMG_LD comprises receiving at least one captured image PIMG_REC.

In particular, the authentication method U_AUTH comprises verifying the access code PIMG_VF, which comprises verifying reference data PIMG_CMP.

In particular, the verification of the access code PIMG_VF verifies whether all of the reference data of the code have been captured n=N?. If not [N], retrieval PIMG_LD of a new relative image is triggered nw_trg by iterating n=n+1 the relative image ir_erc(n).

In particular, if the reference data verification PIMG_COMP is positive [Y], that is to say if a relative image corresponds to the reference datum: ir_erc(n)=dr_vm(n), then the number of relative images is verified n=N?.

If not, that is to say if the reference data verification PIMG_COMP is negative [N], if at least one relative image does not correspond to one of the reference data of the access code: ir_erc(n)≠dr_vm(n), then the reference data verification PIMG_COMP indicates an authentication failure nauth.

In particular, the reference data verification PIMG_COMP receives a stored reference datum dr_vm from the reading DR_RD.

In particular, the authentication failure nauth closes STP_AUTH the authentication method U_AUTH. The authentication closure STP_AUTH possibly sends a failure message that is reproduced by the headset CER to the user.

In particular, the authentication closure STP_AUTH resets the authentication method U_AUTH, which then restarts with the user identifier request UID_REQ and/or the access code retrieval PIMG_LD and/or the request to provide the authentication code PIMG_REQ.

In particular, the successful authentication indication ok_auth is provided to an access method AXP (not illustrated), in particular an access method AXP that sent the authentication request auth_req to the authentication method U_AUTH.

In particular, the successful authentication indication ok_auth triggers validation of access AX_VLD to a service or a device. In particular, an access method AXP (not illustrated), such as an access method AXP that sent the authentication request auth_req to the authentication method U_AUTH, comprises the access validation AX_VLD. The access validation AX_VDL commands ax_cmd the access AXP for the device requesting access, in our invention the first electronic device D', to a device or service.

In particular, the authentication device 1 according to the invention and/or an access provision device 62 implements the steps of the authentication method U_AUTH.

One embodiment of the authentication method U_AUTH is a program comprising program code instructions for executing the steps of the authentication method U_AUTH when said program is executed by a processor.

Figure 5A:
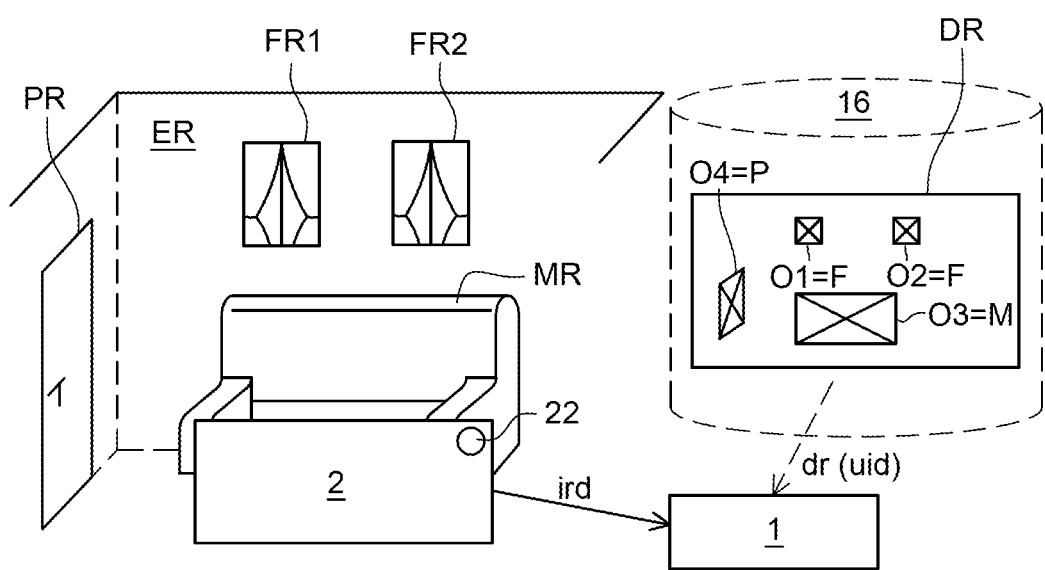
FIG. 5a shows a simplified diagram of a first example of reference data used by the authentication device according to the invention.
Figure 5B:
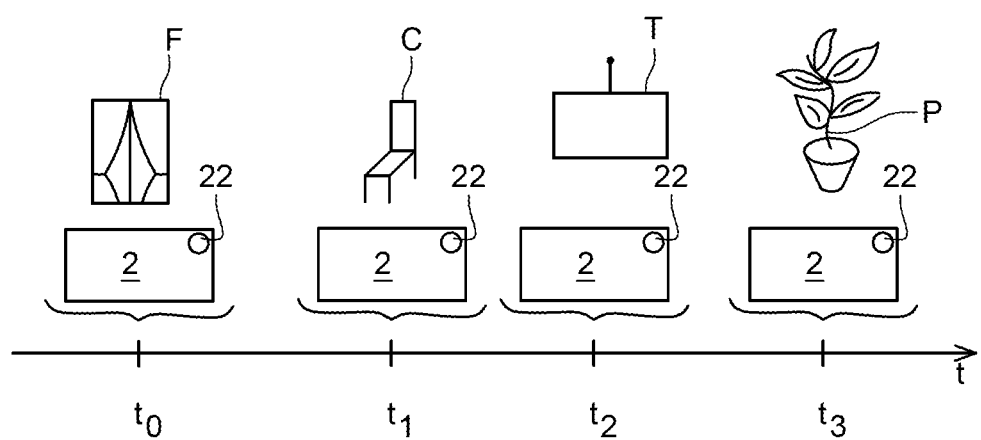
FIG. 5b shows a simplified diagram of a second example of reference data used by the authentication device according to the invention.

FIGS. 5a and 5b show the implementation of the authentication device 1, 21 according to the invention, in particular as illustrated by FIG. 1, for various types of reference data.

FIG. 5a illustrates a simplified diagram of a first example of reference data used by the authentication device 1, 21 according to the invention.

FIG. 5a illustrates the case where the reference data DR stored as an access code in the user base 16 in association with the identifier of the user uid comprises an image of at least part of the environment or a modeling of part of the environment, or even a plan of part of the environment. For example, the reference datum DR formed by a modeling of the environment comprises a modeling of objects O1, O2, O3, O4, such as a model of a window F reproduced twice (for the first and second objects O1 and O2) on the plan of the reference datum DR of FIG. 5a, a model of a sofa M corresponding to the third object of the plan of the reference datum DR of FIG. 5a, and a model of a door P corresponding to the fourth object O4 of the reference datum DR of FIG. 5a.

The user U wearing a virtual reality headset 2 identifies themselves uid. They then position themselves in the environment in order to provide their access code in the form of an "image password", also called "fingerprint of the environment". The camera 22 of the headset 2 photographs the real environment ER formed of a door PR, two windows FR1 and FR2 and a sofa MR. The image ird captured by the headset 2 is transmitted to the authentication device 1, which has retrieved the reference datum dr(uid) corresponding to the user. The authentication device 1 verifies these two information items: reference datum dr(uid) corresponding to the user and captured image ird. In particular, the authentication device implements image recognition to compare the two information items, or even models the captured image ird before comparing it with the reference datum when the reference datum dr(uid) is a model.

FIG. 5b illustrates a simplified diagram of a second example of reference data used by the authentication device 1, 21 according to the invention.

FIG. 5b illustrates the case of an access code formed of a series of images or patterns taken in a predetermined order. The series of reference data stored beforehand in association with the user U indicates that the access code is a series of four images in our example.

In a first variant of the invention, the user U is invited to provide their image access code without further indication. The user, as with an alphanumeric password, has to remember the number of images used and each object stored in the access code.

The authenticating user will thus situate themselves to photograph the objects forming their image access code. In the example of FIG. 5b, they use the camera 22 of the headset 2 to photograph a window at a first time t0, a chair C at a second time t1, a board at a third time t2 and a plant at a fourth time t3.

If the reference data forming the previously stored access code are models, the headset 2 may be used with this same code in a real environment other than the one that was used for the registration of the user, provided that the objects of the image access code are located in this new real environment.

For example, the user registers in their office containing these four elements that are photographed and then modeled to serve as reference data for the stored access code. Next, they use their headset in their living room: instead of the office window, they capture an image of the living room French window there; instead of the office chair, they capture an armchair there; instead of the poster of a planisphere, they capture a picture of an impressionist painting; and instead of a cactus, they capture an image of a shrub or even a tree (through the window). The authentication device 1 receives these four images in succession, models them as a window, seat, board and plant and compares them with the reference data. Here, there is correspondence between the series of captured images and the reference data, and the authentication is therefore successful and access is authorized.

In a second variant of the invention, the user U may be guided so as to provide their image access code: number of images requested, or even type of object. For example, the authentication device may ask the user to photograph a window F, a chair C or a seat, a board T or a detail of a board, and a plant P either without specifying the order or in the required order. In this case, the reference data will preferably be formed of a captured image framed on the objects selected by the user to form their access code in order to strengthen the security of the access code.

The authenticating user will thus situate themselves to photograph the same window, the same chair, the same board and the same plant as when they registered. The authentication device 1 will for example perform image recognition to compare the captured images with the reference data.

In one variant, not illustrated, of the invention, a real object enabling authentication is a personal object, such as a bag, an item of jewelry, a tattoo, etc. The user will thus be able to authenticate themselves anywhere since the authentication will be based on the capture of a personal object or even a series of personal or non-personal objects. The user will also be able to authenticate themselves more quickly since, with the object securing the authentication being personal, the capture of a single object will possibly be sufficient for authentication.

The principle of the invention is that of using a capture of reality that is possible on certain virtual reality headsets so as to manage to transparently authenticate the user. Thus, when the user enters a virtual reality application asking for authentication, the cameras start filming reality, and the application asks the user to look around themselves. Optionally, the application may depict, in virtual reality, the directions that the user's gaze should cover and those already observed.

From there, with conventional image recognition methods, the application determines properties of the room surrounding the user: position of the walls, color of said walls, position of frames, position and size of flat surfaces such as desks or shelves, position of screens, etc. Using this information, the application is able to define a partial map of the room surrounding the user.

The first time the user uses the application in this location, this map and a unique identifier of the headset are saved in order to create a fingerprint of this location, and the user associates it with their account (by identifying themselves with a conventional means, other than the invention).

The following times, this map is compared with the previous maps saved for this headset. If there is a correspondence, it is possible to authenticate the user without further actions on their part.

The correspondence between maps requires different precision depending on the recognized elements: a significant correspondence will for example be expected for the position or the color of the walls and furniture (desk or shelf type), while a certain movement tolerance will for example be accepted for elements such as a screen.

The invention also targets a medium. The information medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from a network, in particular from the Internet.

As an alternative, the information medium may be an integrated circuit in which the program is incorporated, the circuit being designed to execute or to be used in the execution of the method in question.

In another implementation, the invention is implemented by way of software and/or hardware components. With this in mind, the term module may correspond equally to a software component or to a hardware component. A software component corresponds to one or more computer programs, one or more subroutines of a program or, more generally, to any element of a program or of software that is capable of implementing a function or a set of functions in accordance with the above description. A hardware component corresponds to any element of a hardware assembly that is capable of implementing a function or a set of functions.

The invention claimed is:

1. An authentication device for authenticating a user of a virtual reality headset, the authentication device comprising:
   an analyzer configured to verify whether an image relating to at least one element of a real environment captured by the virtual reality headset corresponds to a reference datum stored in association with an identifier of the user of the virtual reality headset, the reference datum corresponding to the image relating to at least one element of the real environment captured by the virtual reality headset during registration.

2. The authentication device as claimed in claim 1, wherein the authentication device comprises a model generator for generating a model of elements of the real environment, and the model generator is configured to determine a model of the element corresponding to the captured image.

3. The authentication device as claimed in claim 1, wherein the authentication device comprises:
   a computer configured to implement image recognition and provides at least one of:
      a result of the verification of the correspondence between the image relating to the at least one the captured element with the reference datum, to the analyzer;
      a model of the element, to a model generator for generating a model of elements of the real environment.

4. The authentication device as claimed in claim 1, wherein the authentication device comprises a controller which controls at least one sensor of the virtual reality headset, the controller being configured to trigger the sensor to provide the image relating to the at least one element of the real environment to the authentication device.

5. The authentication device as claimed in claim 1, wherein the authentication device comprises a generator configured to generate guidance information based on the identifier of the user and provide the guidance information to the virtual reality headset, wherein the guidance information is able to be used to orient the virtual reality headset in a direction associated with the identifier of the user.

6. The authentication device as claimed in claim 1, wherein the analyzer is configured to verify whether a series of images relating to captured elements of the real environment corresponds to a series of reference data stored in association with the identifier of the user requesting authentication.

7. The authentication device as claimed in claim 1, wherein the reference datum at least one type of datum from the following:
   a reference image;
   a reference model of the room and/or of an object of the real environment;
   a reference plan of a room of the real environment.

8. A method for authenticating a user of a virtual reality headset, the authentication method being implemented by an authentication device and comprising:
   receiving an image relating to at least one element of a real environment captured by the virtual reality headset; and
   verifying whether the image captured by the virtual reality headset corresponds to a reference datum stored in association with an identifier of the user of the virtual reality headset, the reference datum corresponding to the image relating to at least one element of the real environment captured by the virtual reality headset during registration.

9. The authentication method as claimed in claim 8, comprising storing in a computer-readable medium the identifier of the user in association with a plurality of distinct reference data corresponding to distinct real environments.

10. The authentication method as claimed in claim 9, wherein the verifying comprises a comparison from the following:
   a comparison with one of the stored reference data corresponding to a location of the virtual reality headset during authentication;
   a comparison with all of the stored reference data.

11. A registration device for registering a user of a virtual reality headset, the registration device comprising:
   a processor; and
   at least one non-transitory computer readable medium comprising instructions stored thereon which when executed by the processor configure the registration device to:
   capture an image relating to at least one element of a real environment using the virtual reality headset; and
   record a reference datum in association with an identifier of the user of the virtual reality headset, the reference datum corresponding to the image relating to at least one element of the real environment captured by the virtual reality headset during registration.

12. A virtual reality headset comprising:
   a registration device for registering a user of a virtual reality headset, the registration device comprising a non-transitory computer readable medium on which is stored, in association with an identifier of the user of the virtual reality headset, a reference datum, the reference datum corresponding to an image relating to at least one element of a real environment captured by the virtual reality headset during registration, and
   an authentication device configured to verify whether a further image relating to the at least one element of the real environment captured by the virtual reality headset corresponds to the reference datum stored in association with the identifier of the user of the virtual reality headset.

13. A method for registering a user of a virtual reality headset, the registration method comprising
   capturing an image relating to at least one element of a real environment by the virtual reality headset; and
   storing, in association with an identifier of the user of the virtual reality headset, a first reference datum, the reference datum corresponding to the image relating to at least one element of the real environment captured by the virtual reality headset during registration.

14. The registration method as claimed in claim 13, wherein the method comprises, when the virtual reality headset is first used in a second real environment, repeating the storing for the user for a second reference datum.

15. A non-transitory computer readable medium comprising a program stored thereon comprising program code instructions for executing a method for authenticating a user of a virtual reality headset when said program is executed by a processor of an authentication device, wherein the method comprises:
   receiving an image relating to at least one element of a real environment captured by the virtual reality headset; and
   verifying whether the image captured by the virtual reality headset corresponds to a reference datum stored in association with an identifier of the user of the virtual reality headset, the reference datum corresponding to the image relating to at least one element of the real environment captured by the virtual reality headset during registration.

* * * * *